(12) United States Patent
Dennis et al.

(10) Patent No.: US 10,891,268 B2
(45) Date of Patent: Jan. 12, 2021

(54) METHODS AND SYSTEM FOR DETERMINING A MOST RELIABLE RECORD

(71) Applicant: Experian Health, Inc., Franklin, TN (US)

(72) Inventors: John Dennis, Marietta, GA (US); Sean Daniel Reisz, Tucker, GA (US); Matthew McCawley, Marietta, GA (US); Christopher Wavil Moody, Rockmart, GA (US); Dimuthu A. Wijetilleke, Atlanta, GA (US)

(73) Assignee: Experian Health, Inc., Franklin, TN (US)

( * ) Notice: Subject to any disclaimer, the term of this patent is extended or adjusted under 35 U.S.C. 154(b) by 738 days.

(21) Appl. No.: 15/472,430

(22) Filed: Mar. 29, 2017

(65) Prior Publication Data
US 2018/0285355 A1 Oct. 4, 2018

(51) Int. Cl.
*G06F 16/18* (2019.01)
*G06F 16/907* (2019.01)

(52) U.S. Cl.
CPC ........ *G06F 16/1873* (2019.01); *G06F 16/907* (2019.01)

(58) Field of Classification Search
CPC ........ G06F 17/30477; G06F 17/30577; G06F 17/3023; G06F 17/30997; G06F 7/02; G06F 21/00; G06F 16/907; G06F 16/1873; G06Q 40/025
See application file for complete search history.

(56) References Cited

U.S. PATENT DOCUMENTS

| | | | | |
|---|---|---|---|---|
| 2010/0293090 | A1* | 11/2010 | Domenikos | G06Q 40/025 705/38 |
| 2012/0310937 | A1* | 12/2012 | Stibel | G06Q 30/018 707/737 |
| 2014/0180826 | A1* | 6/2014 | Boal | G06Q 30/0245 705/14.66 |
| 2015/0120725 | A1* | 4/2015 | de Vries | G06Q 10/10 707/736 |
| 2015/0348188 | A1* | 12/2015 | Chen | G06Q 40/04 705/37 |
| 2016/0147844 | A1* | 5/2016 | Adderly | G06F 16/24573 707/725 |
| 2017/0039242 | A1* | 2/2017 | Milton | G06Q 30/0269 |

* cited by examiner

*Primary Examiner* — Matthew J Ellis
(74) *Attorney, Agent, or Firm* — Knobbe, Martens, Olson & Bear, LLP (57) ABSTRACT

A request for a most reliable demographic fields data for a selected demographic field associated with an entity may be received at an entity matching system. A plurality of records associated with the entity may be received at the entity matching system. Each of the plurality of records may include at least one demographic field. A demographic field corresponding to the selected demographic field may be identified from the at least one demographic field for each of the plurality of records. A reliability score may be determined for the corresponding demographic field for each of the plurality of records. The corresponding demographic field with the highest reliability score may be determined as the most reliable demographic fields data.

20 Claims, 5 Drawing Sheets

METHODS AND SYSTEM FOR DETERMINING A MOST RELIABLE RECORD

BACKGROUND

Several industries use various methodologies to record demographic data associated with entities. However, when multiple persons enter the demographic data at one source or multiple sources, it becomes challenging to maintain consistency. Data entry errors add to the challenge, as entered data often include typographical errors and therefore cannot be relied upon. With inconsistencies, it becomes challenging to link two records and confirm that they belong to a single entity. Similarly, if two records have two different entries for a same demographic field, it becomes difficult to determine which one of the two entries is an accurate entry.

SUMMARY

Aspects of methods and systems for determining a record having a most reliable demographic fields data are provided herein. A request for a most reliable demographic fields data for a selected demographic field associated with an entity may be received. A plurality of records associated with the entity may be received. Each of the plurality of records may include at least one demographic field. A demographic field corresponding to the selected demographic field may be identified from the at least one demographic field for each of the plurality of records. A reliability score may be determined for the corresponding demographic field for each of the plurality of records. The corresponding demographic field with the highest reliability score may be determined as the most reliable demographic fields data.

Examples are implemented as a computer process, a computing system, or as an article of manufacture such as a device, computer program product, or computer readable medium. According to an aspect, the computer program product is a computer storage medium readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

Further features, aspects, and advantages of the invention represented by the examples described in the present disclosure will become better understood by reference to the following detailed description, appended claims, and accompanying Figures, wherein elements are not to scale so as to more clearly show the details, wherein like reference numbers indicate like elements throughout the several views, and wherein:

DETAILED DESCRIPTION

Aspects of methods and systems for determining a relative accuracy of a demographic data are provided herein. For example, when one or more sources have multiple records with multiple entries for a demographic field, it may send a request to determine the most reliable entry for the demographic field. For example, "JOHN DENNIS" may check into hospitals A, B, C, and D, prescription stores E, F, and G, etc. These sources visited by "JOHN DENNIS" may enter demographic fields with data such as a first name, a last name, a date of birth, an address, etc. Hence, these sources create multiple records for an individual "JOHN ERWIN DENNIS". The demographic fields data at these sources may be entered by different persons, leading to discrepancies between demographic fields data in some records. For example, a first record may include a nickname "BABY" in place of first name "JOHN" in a first record. A second record may contain a middle name "ERWIN" as the first name. In addition, there may have been a typographical error in entry of the demographic fields data.

In one aspect the disclosure provides methods and systems for determining a most reliable entry for a demographic fields data when there are multiple different versions of the demographic fields data in multiple records. One of the multiple sources can send these multiple records to an entity matching system with a request to determine a most reliable record for a selected demographic field. For example, hospital A may send a request to the entity matching system a request to determine a record which includes a most reliable entry for the first name field for "JOHN ERWIN DENNIS." An entity matching system then identifies the first name field for each received record. After identifying the first name field, the entity matching system determines a reliability score for each of the first name fields.

In one aspect, the reliability score may be a combination of three scores, that is, a frequency score, an aging score, and a quality score. The frequency score is determined based on a number of occurrences of a particular first name, such as, "JOHN", "JON", etc. The aging score is determined based on a half-life of the selected demographic field and the age of the record. The quality score is determined based on the data entry quality of the source associated with the record. One or all of the frequency score, the aging score, and the quality score may be aggregated to determine the reliability score of the first name field for each of the records. A record with the highest reliability score may be selected to be the most reliable record for the first name field.

In addition, the determined most reliable first name field is compared with a matching record of a reliable data source accessible to the entity matching system. Based on the comparison, one of the two records may be updated. For example, if two records do not match, then the matching record from the reliable data source may be updated if the reliability score of the most reliable first name field is more than a predetermined threshold. If it is not more than the threshold, then the first name field in the matching record of the reliable data source may be declared most reliable. The most reliable first name is then returned to the requesting entity, that is, hospital A in the above scenario.

Figure 1:
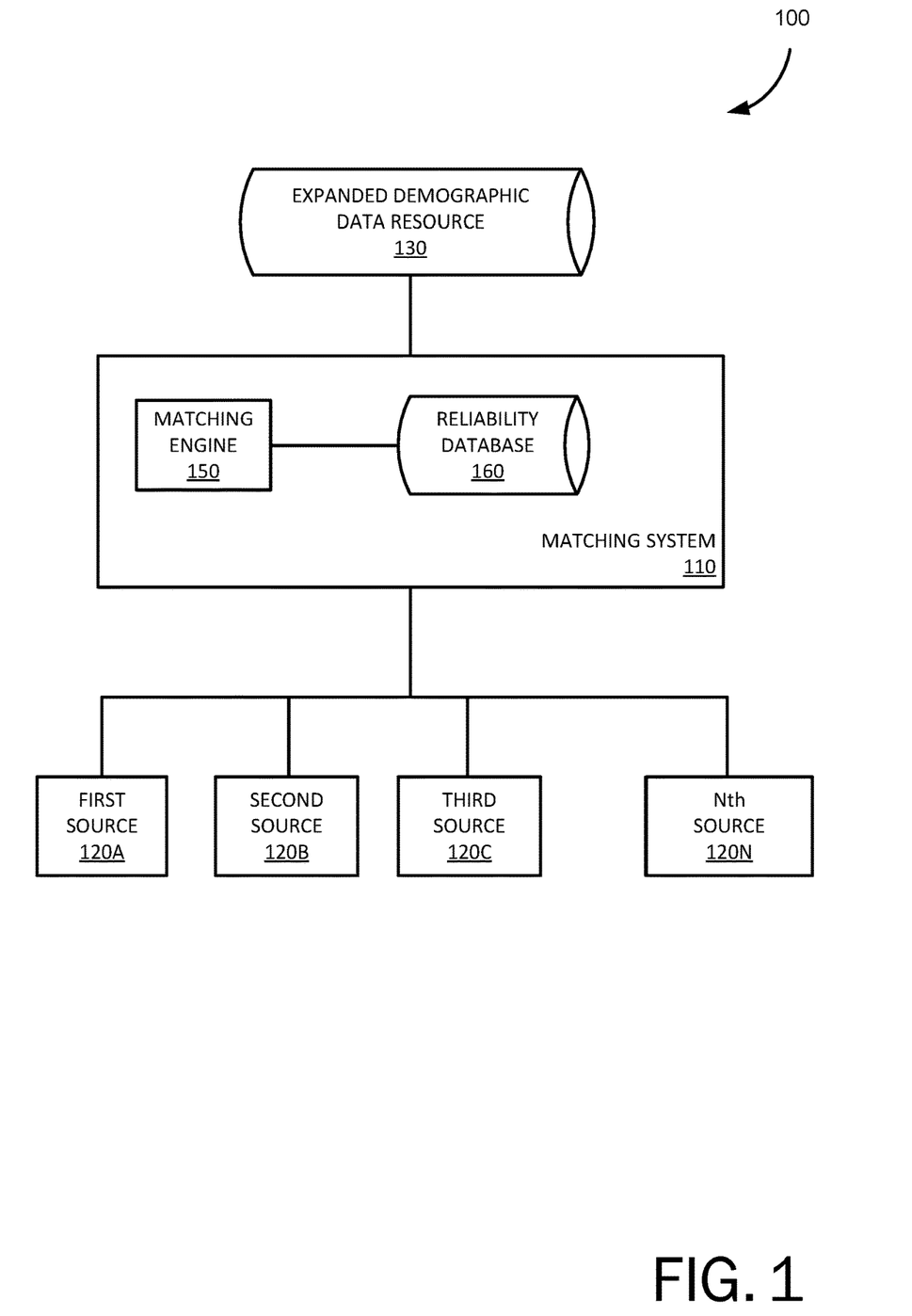
FIG. 1 illustrates an example operating environment in which reliability determination may be performed.

FIG. 1 illustrates an example operating environment 100 in which expanded data processing for improved entity matching may be performed. As illustrated in FIG. 1, example operating environment 100 includes a matching system 110, a plurality of sources 120A-N (collectively source 120), and an expanded demographic data resource 130. Matching system 110 communicates with source 120 and expanded demographic data resource 130 to provide a most reliable data to a requesting source that has sent a request for the most reliable data for a demographic field from a plurality of records. Matching system 110 includes a matching engine 150 and a reliability database 160. In addition, matching system 110 may include an index (not shown) of expanded demographic data resource 130. The index includes an index of records from expanded demographic data resource 130. For example, the index may include a list of unique identifiers associated with each records of expanded demographic data resource 130.

In various aspects, expanded demographic data resource 130 includes a computer system for a credit agency (e.g., providing credit header data for an entity's demographics), for a commercial entity (e.g., providing consumer shipping or loyalty program details for an entity's demographics), or for a governmental agency (e.g., providing official records for an entity's demographics). Although examples are given primarily in terms of human persons, it will be understood that entities include non-human persons (e.g., corporations, partnerships, agencies), animals, and inanimate objects (e.g., vehicles).

Matching system 110, source 120, and expanded demographic data resource 130 are operable to communicate with each other over one or more communications links, such as, Internet, local area network, wireless network, wired network, etc. Source 120 may be remote or local to the computing environment in which matching system 110 is operated. In addition, source 120 may be associated with a service provider, such as a health service provider, a financial service provider, a prescription service provider, etc.

Figure 5:
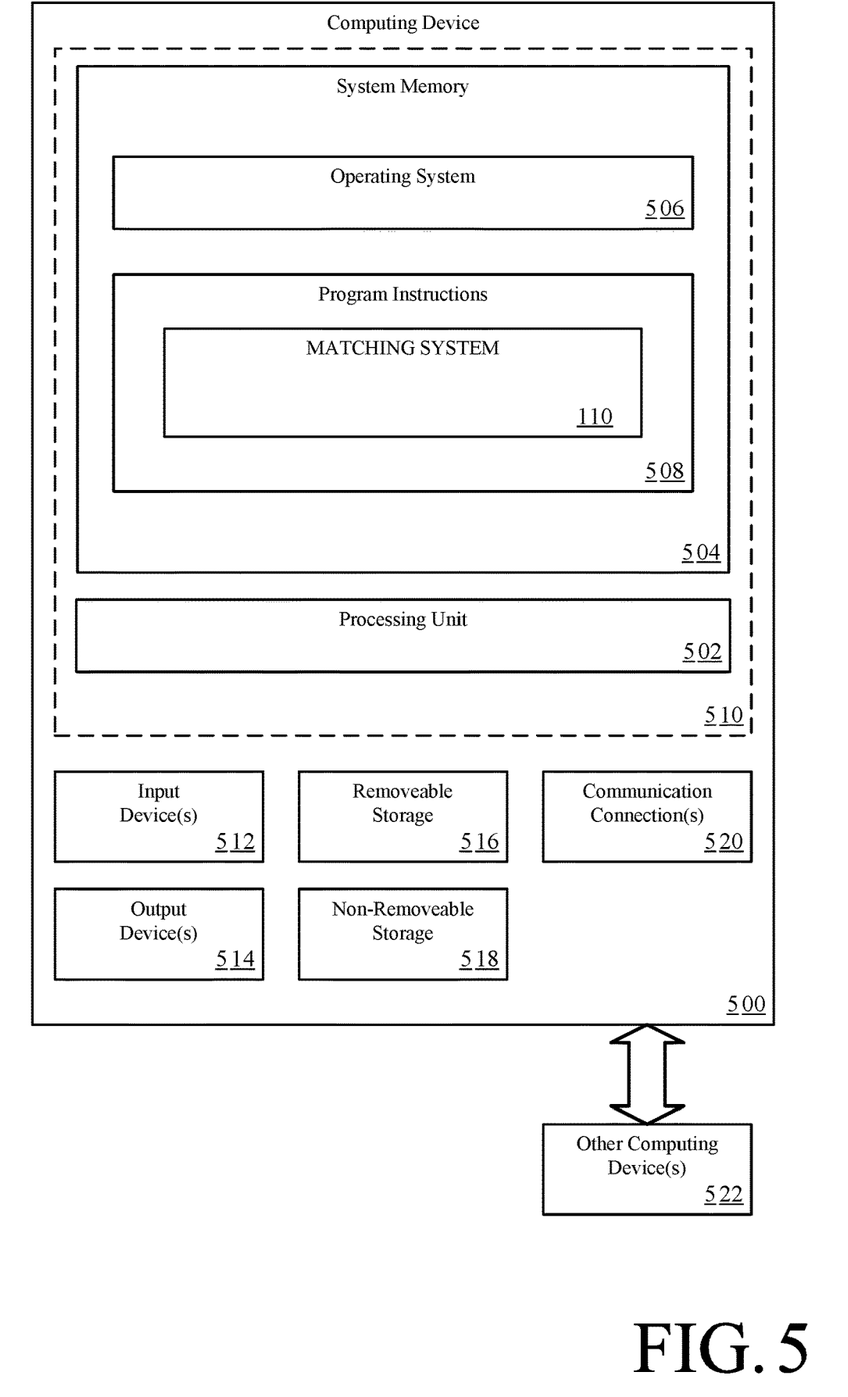
FIG. 5 is a block diagram illustrating example physical components of a computing device with which aspects of disclosure may be practiced.

Matching system 110, source 120, and expanded demographic data resources 130 are illustrative of a wide variety of computing devices, the hardware of which is discussed in greater detail in regard to FIG. 5. The computing device may include, but are not limited to: servers, desktop computers, laptops computers, tablets, smart phones, personal digital assistants, and distributed systems that are run on multiple computing devices. In various aspects, matching system 110, source 120, and expanded demographic data resources 130 may communicate with one another via the Internet, a private network, or a virtual private network or tunnel over a public network, which may include wired and wireless components to link systems that are located remotely from each other.

Figure 2:
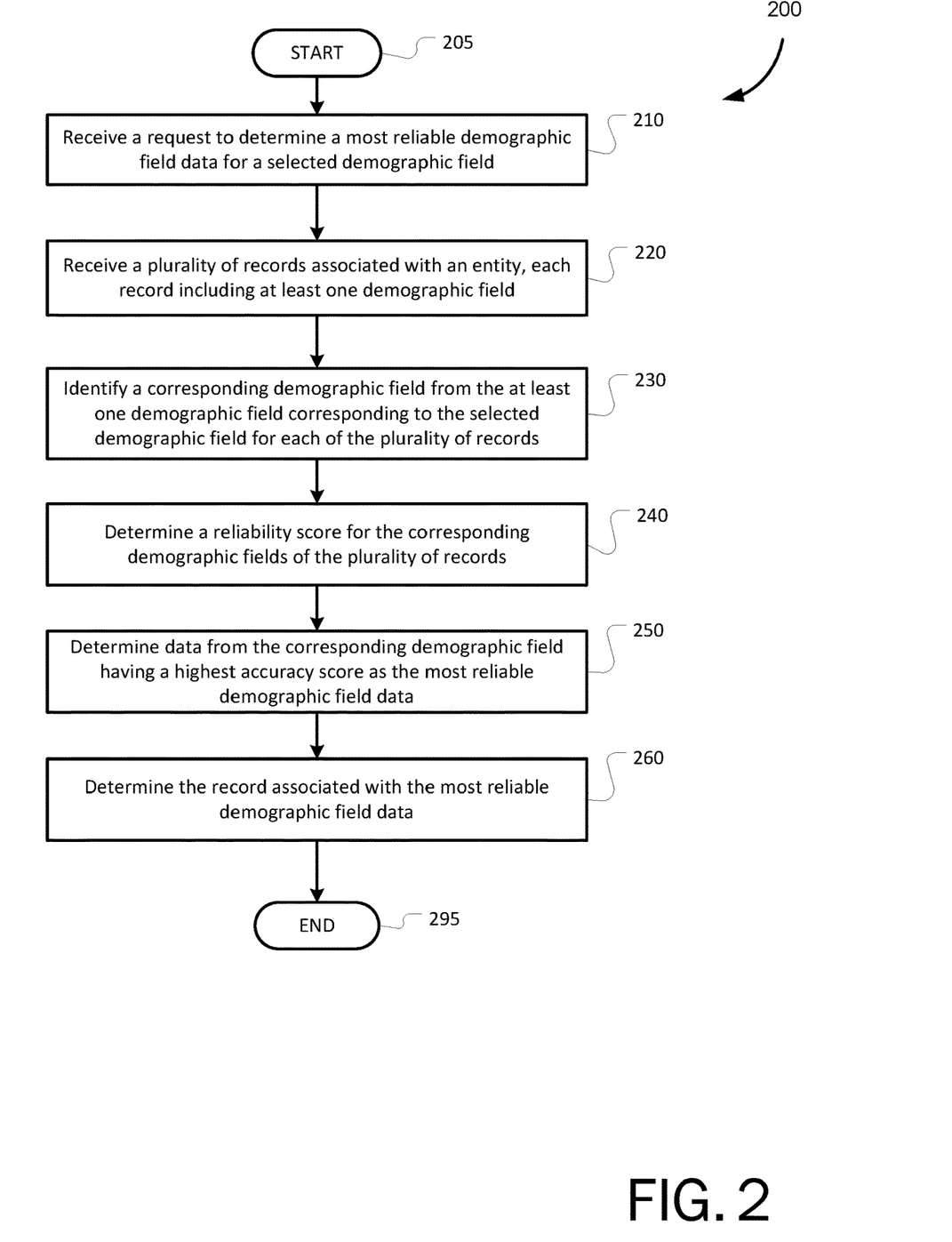
FIG. 2 is a flow chart showing general stages involved in an example method for determining a most reliable demographic fields data.

FIG. 2 is a flow chart showing general stages involved in an example method 200 for the matching system 110. Method 200 begins at START OPERATION 205 and proceeds to OPERATION 210, where a request for a most reliable demographic fields data for a selected demographic field is received. For example, a request may be received to determine most a reliable first name, last name, address, and a social security number, etc. associated with an entity. For example, a request may be received to determine the most reliable first name for entity "JOHN ERWIN DENNIS." For example, the entity may be identified by a unique identifier number, such as a social security number of a name on a given record. In one aspect, the unique identifier may be assigned to each entity having an associated record in the expanded demographic data resource 130. If there is no associated record in the expanded demographic data resource 130 corresponding to an entity, matching system 110 may create one and assign it to the entity. In one aspect, a request may be received to determine a record having the most reliable demographic fields data for more than one demographic field. In another aspect, a request may be received to determine a record that has the most reliable demographic fields data.

In one aspect, the request is received from a source associated with the entity. For example, the request may be received from a hospital or a prescription-filling source to which the entity makes frequent visits. In another aspect, the request is received from more than one source. For example, the request may be received from both a hospital and a prescription-filling source associated with the entity. The request may be generated by a source, such as first source 120A, and may be received at matching system 110. In one aspect, the request is received over a communication medium such as the Internet. In another aspect, the request is received in the form of one or more records associated the entity. The records may be received as electronic scanned copies or as a photograph.

After receiving the request to determine the most reliable demographic fields data at OPERATION 210, method 200 may proceed to OPERATION 220 where a plurality of records associated with the entity may be received. Each of the plurality of records includes at least one demographic data field. For example, each of the records may include at least one of a first name field, a middle name field, an address field, a date of birth field, a social security number field, etc. Each of the plurality of demographic fields may include corresponding demographic fields data.

In one aspect, the corresponding demographic fields data may be missing from the received request. In another aspect, the corresponding demographic fields data may be partially complete or incorrectly entered. For example, in the previous example of "JOHN ERWIN DENNIS", the first name in one or more of the records may be missing completely or may be spelled as "JON", "JONE", "JOHNY", etc. In another example, the first name in one or more of the records may be replaced by a nick name. Similarly, the last name in one or more of the records may be missing completely or may be spelled as "DENIS", "DENISE", "DENNOS", etc. In another example, the last name in one or more of the records may be replaced by a middle name "ERWIN". In another example, the first name, the middle name, and the last name in one or more of the records may be juxtaposed. In yet another example, one or more records may include past data, such as a previous addresses, for the entity.

Once having received the plurality of records at OPERATION 220, method 200 proceeds to OPERATION 230, where demographic fields corresponding to the selected demographic field are identified. For example, for each of the plurality of records, matching system 110 identifies the demographic field which corresponds to the selected demographic field received in the request. For example, if the selected demographic field in the request is the first name, then matching system 110 identifies the first name field for each of the plurality of records. Similarly, if the selected demographic field in the request is the address, then matching system 110 identifies the address field for each of the plurality of records.

After identifying the corresponding demographic fields at OPERATION 230, method 200 proceeds to OPERATION 240, where a reliability score for each of the corresponding data fields is determined. For example, matching system 110 determines the reliability score based on a frequency score, an aging score, and a quality score associated with the corresponding demographic field. An example method for determining the reliability score is described in greater detail with respect to FIG. 3.

Once the reliability scores are determined at OPERATION 240, method 200 proceeds to OPERATION 250, where data from the corresponding demographic field having a highest reliability score is determined as the most reliable demographic fields data. For example, after determining the reliability scores, matching system 110 may sort the corresponding demographic fields in an ascending and descending order of the reliability score. A corresponding demographic field with the highest reliability score is then determined. The data in the corresponding demographic field with the highest reliability score is then determined. The determined data in the corresponding demographic field with the highest reliability score is then returned as the most reliable demographic fields data for the selected demographic field. The most reliable data may be returned to a requesting source, (e.g., the first source 120A). After returning the most reliable data at OPERATION 250, method 200 may proceed to OPERATION 260 where the record associated with the most reliable demographic fields data is determined and returned to the requester. After determining the record associated with the most reliable demographic fields data at OPERATION 260, method 200 then concludes at END OPERATION 295.

In one aspect, before returning the most reliable demographic fields data, matching system 110 may attempt to locate a corresponding record in the expanded demographic data resource 130. If there is no corresponding record in the expanded demographic data resource 130, matching system 110 may create a record, assign a unique identifier to the created record, and populate the created record with demographic fields data from the received request.

In another aspect, if there is a corresponding record in the expanded demographic data resource 130, matching system 110 may compare corresponding demographic fields data with the determined most reliable demographic fields data. If there is a match, matching system 110 may return the most reliable demographic fields data to source 120. However, if there is no match, matching system 110 may compare the reliability score of the most reliable demographic fields data with a predetermined threshold. If the reliability score is more than the predetermined threshold, matching system 110 may determine the most reliable demographic fields data to be more reliable than one stored in the expanded demographic data resource 130. Matching system 110 may update the corresponding demographic fields data in the record with the determined most reliable demographic fields data. However, if the reliability score is less than the predetermined threshold, matching system 110 may determine the most reliable demographic fields data to be less reliable than one stored in expanded demographic data resource 130. Matching system 110 then may return demographic fields data from expanded demographic data resource 130 as the most reliable data to source 120. Hence, source 120 may be able to determine whether the demographic fields data provided by an entity is fraudulent, fake, or miss-entered data.

In one aspect, matching engine 150 may determine a record with most reliable demographic fields data for more than one selected demographic field. For example, matching engine 150 may determine a record with most reliable demographic fields data for more than two or more selected demographic fields. In another aspect, matching engine 150 may determine a record with a highest aggregate reliability score for a predetermined number of selected demographic fields. In yet another aspect, matching engine 150 may determine a record with an overall reliability score for a plurality of demographic fields.

Figure 3:
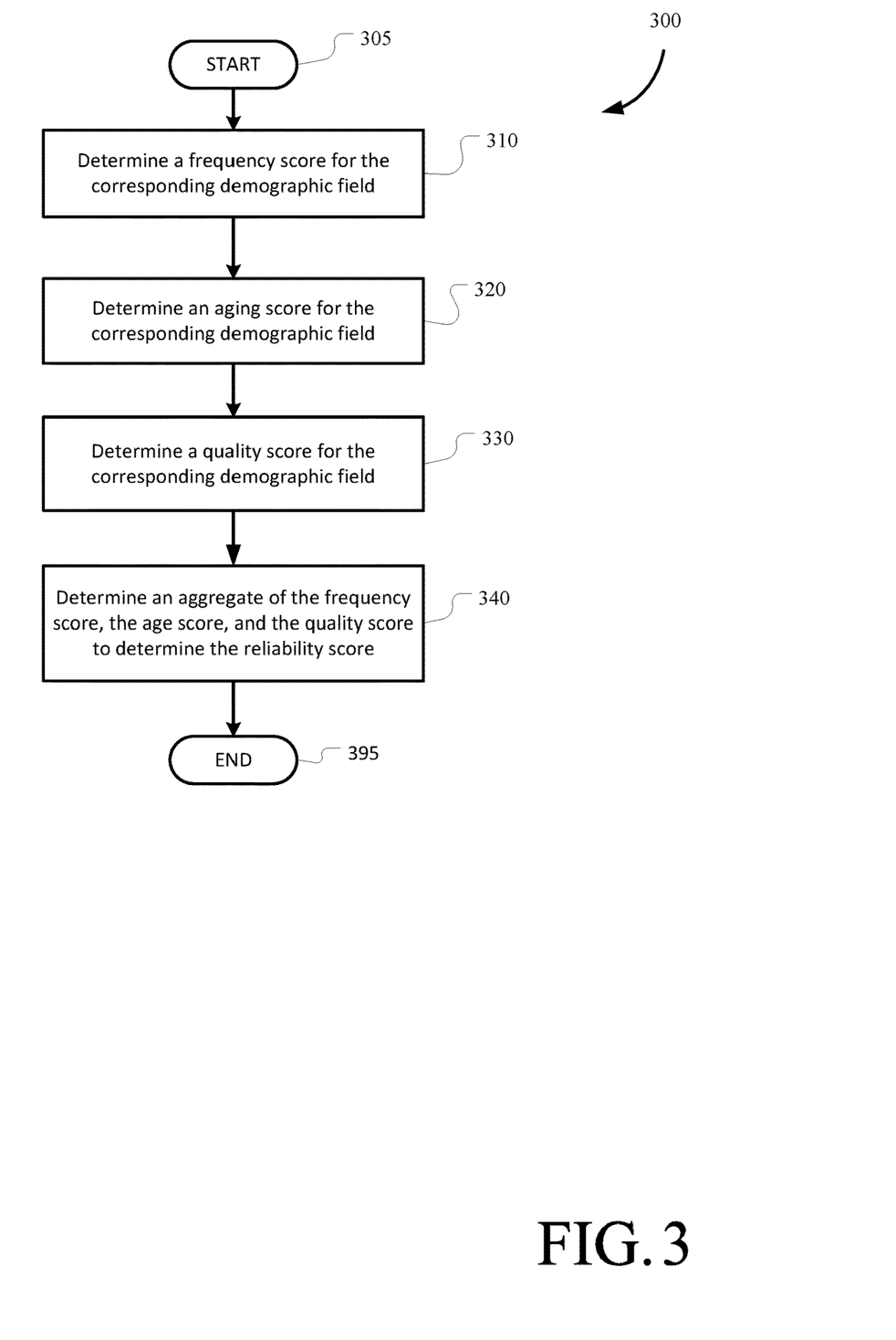
FIG. 3 is a flow chart showing in the general stages involved in the example method for determining a reliability score.

FIG. 3 is a flow chart showing general stages involved in a method 300 for determining a reliability score. Method 300 begins at START OPERATION 305 and proceeds to OPERATION 310, where a frequency score for the corresponding demographic field may be determined. For example, the frequency score is determined based on an occurrence count of a demographic fields data in the plurality of records. In one aspect, matching engine 150 is operable to determine the frequency score associated with a corresponding demographic field. An example method for determining the frequency score is described in greater detail with respect to FIG. 4A.

After determining the frequency score at OPERATION 310, method 300 proceeds to OPERATION 320, where an aging score for the corresponding demographic field is determined. For example, the aging score is determined based on a half-life of the demographic field and an age of the demographic fields data (See FIG. 4B). In one aspect, matching engine 150 is operable to determine the aging score of the corresponding demographic data field. An example method for determining the aging score is described in greater detail with respect to FIG. 4B.

After determining aging score at OPERATION 320, method 300 proceeds to OPERATION 330, where a quality score for the corresponding demographic field is determined. The quality score for a demographic field is determined based on a quality score associated with a source of the demographic data field. In one aspect, a quality score is associated with each source 120. For example, matching engine 150 may assign a quality score to each unique source either in expanded demographic data resource 130 or reliability database 160. The quality score is assigned based on accuracy of demographic fields data provided by the source corresponding to a record. The assigned quality score is updated regularly. For example, the quality score is updated each time a record is received from a source. The quality score assigned to a source is relative score. For example, the quality factor is assigned based on accuracy of received demographic fields data in comparison to other sources.

After determining the quality score at OPERATION 330, method 300 proceeds to OPERATION 340, where the frequency score, the aging score, and the quality score is aggregated to determine the reliability score for the corresponding demographic field. In one aspect, matching engine 150 is operable to aggregate the frequency score, the aging score, and the quality score to determine the reliability score. In one aspect, matching engine 150 is operable to simply aggregate the frequency score, the aging score, and the quality score to determine the reliability score. In another aspect, matching engine 150 is operable to assign more weightage to one or more of the frequency score, the aging score, and the quality score in the aggregation to determine the reliability score. After creating the reliability score at OPERATION 340, method 300 concludes at END OPERATION 395.

Figure 4A:
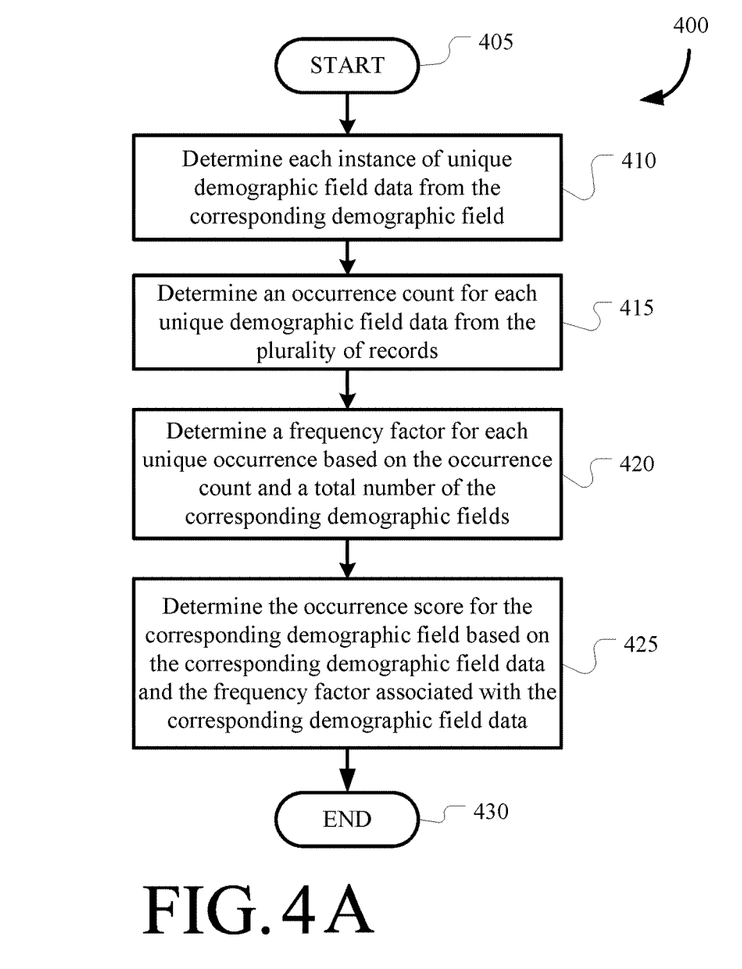
FIG. 4A is a flow chart showing general stages involved in an example method for determining a frequency score.

FIG. 4A is a flow chart showing general stages involved in a method 400 for determining a frequency score associated with a corresponding demographic field. Method 400 begins at START OPERATION 405 and proceeds to OPERATION 410, where each instance of unique demographic fields data from the corresponding demographic fields are determined. For example, in the previous example of most reliable first name "JOHN ERWIN DENNIS", all unique instances of first name entered in the first name field of the plurality of records is determined. For example, each instances first name being entered as "JOHN", "JON", "JONE", "JOHNY", "ERWIN", "BABY", etc., is determined. In one aspect, matching engine 150 is operable to determine each instance of unique demographic fields data.

After determining each instance of unique demographic fields data at OPERATION 410, method 400 proceeds to OPERATION 415, where an occurrence count for each unique instances is determined. The occurrence count for each unique instance is determined from the plurality of records. For example, in the previous example of "JOHN ERWIN DENISS", an occurrence count for each of "JOHN", "JON", "JONE", "JOHNY", "ERWIN", "BABY" etc., is determined. In one aspect, matching engine 150 is operable to determine the occurrence count.

After determining the occurrence count at OPERATION 415, method 400 proceeds to OPERATION 420, where the frequency factor is determined for each unique occurrence. For example, the frequency factor is determined based on the occurrence count and a total count of the corresponding demographic fields. The frequency factor may be determined as a function of a ratio between the occurrence count and a total count of the corresponding data fields. For example, if first name "JON" appeared in two out of ten records, then frequency factor for the occurrence "JON" may be determined as 0.2. Similarly, if first name "JOHN" appeared in five out of ten records, then frequency factor for the occurrence "JOHN" may be determined as 0.5. In one aspect, matching engine 150 is operable to determine the frequency factor.

After determining the frequency factor at OPERATION 420, method 400 proceeds to OPERATION 425, where the frequency score is determined for the corresponding demographic field based on the corresponding demographic fields data and the frequency factor associated with the corresponding demographic field. For example, if the corresponding first name field data for a first record is "JOHN", then the frequency factor for the first name field of the first record may be determined as 0.5. Similarly, if the corresponding first name field data for a first record is "JON", then the frequency factor for the first name field of the first record may be determined as 0.2. After determining the frequency score at OPERATION 425, method 400 may conclude at END OPERATION 430. In one aspect, matching engine 150 is operable to determine the frequency score from the frequency factor.

Figure 4B:
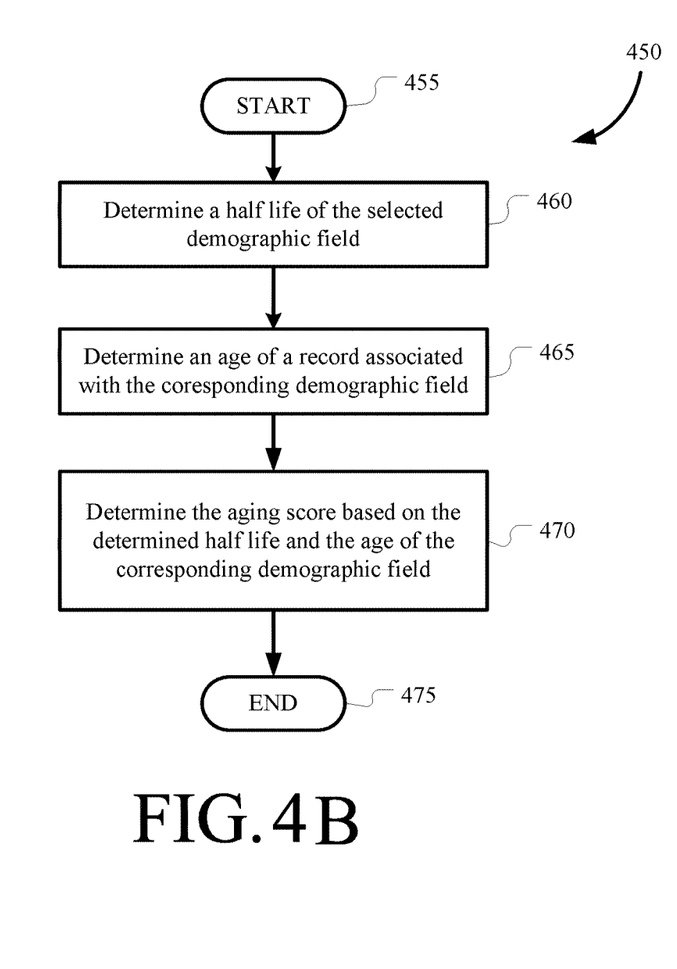
FIG. 4B is a flow chart showing general stages involved in an example method for determining an aging score.

FIG. 4B is a flow chart showing general stages involved in a method 450 for determining an aging score associated with a corresponding demographic field. Method 400 begins at START OPERATION 455 and proceeds to OPERATION 460, where a half-life of the selected demographic field may be determined. For example, matching engine 150 may determine and store a half-life for a plurality of demographic fields in reliability database 160. In one aspect, a half-life for a demographic field is determined based on empirical or statistical analysis of frequency of change of the corresponding demographic fields data. For example, a date of birth associated with an entity may never change; hence the half-life of the date birth field may be close to infinity. In another example, the half-life of a social security number field may be lesser than the data of birth field as there is a probability of a person being assigned a new social security number. Similarly, the half-life of an address field may between one and seven years. The half-life of an age field may be less than a year (e.g., six months), as it is going to change every year. In one aspect, matching engine 150 may maintain a half-life index for unique demographic fields in expanded demographic data resource 130 or reliability database 160. Hence, matching engine 150 may determine the half-life of a demographic field by simply performing a lookup operation in the half-life index.

After determining the half-life of the selected demographic field at OPERATION 460, method 450 proceeds to OPERATION 465, where an age of the record associated with the corresponding demographic field is determined. For example, matching engine 150 may determine the age of the record from a date of creation of the record and a current date.

After determining the age at OPERATION 465, method 450 proceeds to OPERATION 470, where the aging factor is determined. The aging factor is determined based on the half-life of the selected demographic field and age of the record for the corresponding demographic field. For example, if the age of a first record is more than the half-life, then the aging factor for the corresponding demographic field associated with the first record will be lesser than the aging factor for the corresponding demographic field associated with a second record having its age less than the half-life. In one aspect, the aging score for a demographic field is determined based on empirical or statistical analysis of a relationship between the age, the half-life, and the frequency of change of the corresponding demographic fields data. After determining the aging score at OPERATION 470, method 450 concludes at END OPERATION 475.

FIG. 5 is a block diagram illustrating physical components of an example computing device with which aspects may be practiced. The computing device 500 includes at least one processing unit 502 and a system memory 504. System memory 504 may comprise, but is not limited to, volatile (e.g. random access memory (RAM)), non-volatile (e.g. read-only memory (ROM)), flash memory, or any combination thereof. System memory 504 includes operating system 506, one or more program instructions 508, and sufficient computer-executable instructions for a 1080p system, which when executed, perform functionalities as described herein. Operating system 506, for example, may be suitable for controlling the operation of computing device 500. Furthermore, aspects may be practiced in conjunction with a graphics library, other operating systems, or any other application program and is not limited to any particular application or system. This basic configuration is illustrated by those components within a dashed line 510. Computing device 500 also includes one or more input device(s) 512 (keyboard, mouse, pen, touch input device, etc.) and one or more output device(s) 514 (e.g., display, speakers, a printer, etc.).

The computing device 500 may further include additional data storage devices (removable or non-removable) such as, for example, magnetic disks, optical disks, or tape. Such additional storage is illustrated by a removable storage 516 and a non-removable storage 518. Computing device 500 also contains a communication connection 520 that allows computing device 500 to communicate with other computing devices 522, such as over a network in a distributed computing environment, for example, an intranet or the Internet. Communication connection 520 is one example of a communication medium, via which computer-readable transmission media (i.e., signals) may be propagated.

Programming modules, may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Furthermore, aspects may be practiced in an electrical circuit comprising discrete electronic elements, packaged or integrated electronic chips containing logic gates, a circuit using a microprocessor, or on a single chip containing electronic elements or microprocessors (e.g., a system-on-a-chip (SoC)). Aspects may also be practiced using other technologies capable of performing logical operations such as, for example, AND, OR, and NOT, including, but not limited to, mechanical, optical, fluidic, and quantum technologies. In addition, aspects may be practiced within a general purpose computer or in any other circuits or systems.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, microcode, etc.) may provide aspects discussed herein. Aspects may take the form of a computer program product on a computer-usable or computer-readable storage medium having computer-usable or computer-readable program code embodied in the medium for use by, or in connection with, an instruction execution system.

Although aspects have been described as being associated with data stored in memory and other storage mediums, data can also be stored on or read from other types of computer-readable media, such as secondary storage devices, like hard disks, floppy disks, or a CD-ROM, or other forms of RAM or ROM. The term computer-readable storage medium refers only to devices and articles of manufacture that store data or computer-executable instructions readable by a computing device. The term computer-readable storage media do not include computer-readable transmission media.

Aspects of the present invention may be used in various distributed computing environments where tasks are performed by remote processing devices that are linked through a communications network.

Aspects of the invention may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented with computing device 500 or any other computing devices 522, in combination with computing device 500, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described aspects.

The description and illustration of one or more aspects provided in this application are intended to provide a thorough and complete disclosure the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

We claim:

1. A method comprising:
   receiving a request for a most reliable demographic fields data for a selected demographic field;
   receiving a plurality of records, each of the plurality of records comprising at least one demographic field;
   identifying a corresponding demographic field from the at least one demographic field corresponding to the selected demographic field for each of the plurality of records;
   determining a reliability score for the corresponding demographic field for each of the plurality of records that includes:
      determining an aging score based on a half-life of the selected demographic field and an age of a corresponding record, including determining the half-life of the selected demographic field according to a half-life index,
      determining a frequency score associated with the corresponding demographic field,
      determining a quality score associated with the corresponding demographic field, and
      aggregating the aging score, the frequency score, and the quality score to determine the reliability score for the corresponding demographic field; and
   determining the corresponding demographic field with a highest reliability score as the most reliable demographic fields data.

2. The method of claim 1, wherein determining the frequency score comprises:
   determining each instance of unique demographic fields data from the corresponding demographic field;
   determining an occurrence count for each unique demographic fields data from the plurality of records; and
   determining the frequency score based on the occurrence count and a total number of corresponding demographic fields.

3. The method of claim 1, wherein determining the quality score comprises:

determining a source associated with the corresponding demographic field;
determining a quality score assigned to the source; and
determining the quality score for the corresponding demographic field as the quality score assigned to the source associated with the corresponding demographic field.

4. The method of claim 3, wherein determining the source comprises determining the source responsible for generating the corresponding record.

5. The method of claim 3, further comprising determining the quality score to be assigned to the source.

6. The method of claim 5, wherein determining the quality score to be assigned to the source comprises:
receiving a first record from the source;
determining an accuracy of demographic fields data in the first record; and
determining the quality score based on the determined accuracy.

7. The method of claim 6, wherein determining the accuracy of the demographic fields data in the first record comprises determining the accuracy of the demographic fields data in the first record by comparing the demographic fields data in the first record with corresponding demographic fields data in a stored record from an expanded data resource.

8. The method of claim 6, further comprising:
receiving a second record from the source;
determining the accuracy of the demographic fields data in the second record; and
adjusting the quality score based on the determined accuracy.

9. The method of claim 1, wherein receiving the plurality of records comprises receiving the plurality of records from a plurality of sources, each of the plurality of sources sending at least one of the plurality of records.

10. The method of claim 1, wherein receiving the plurality of records comprises receiving the plurality of records from a single source.

11. A system comprising:
a processor; and
a memory storage device including instructions that when executed by the processor are operable to:
receive a request for a most reliable demographic fields data for a selected demographic field associated with an entity;
receive a plurality of records associated with the entity, each of the plurality of records comprising at least one demographic field;
identify a demographic field corresponding to the selected demographic field from the at least one demographic field for each of the plurality of records;
determine a reliability score for the corresponding demographic field for each of the plurality of records that includes:
a determination of an aging score based on a half-life of the selected demographic field and an age of a corresponding record, wherein the half-life of the selected demographic field is determined according to a half-life index,
a determination of a frequency score associated with the corresponding demographic field,
a determination a quality score associated with the corresponding demographic field, and
an aggregation of the aging score, the frequency score, and the quality score to determine the reliability score for the corresponding demographic field; and
determine the corresponding demographic field with a highest reliability score as the most reliable demographic fields data.

12. The system of claim 11, wherein the instructions that when executed by the processor are further operable to:
determine a stored record associated with the entity;
determine the corresponding demographic fields data in the stored record;
compare the most reliable demographic fields data with the corresponding demographic field data of the stored record; and
replace, when the most reliable demographic fields data does not match with the corresponding demographic field data, the corresponding demographic field data with a most reliable demographic fields data.

13. The system of claim 11, wherein the instructions which when executed by the processor are further operable to:
determine each instance of unique demographic fields data from the corresponding demographic field;
determine an occurrence count for each unique demographic fields data from the plurality of records; and
determine the frequency score based on the occurrence count and a total number of corresponding demographic fields.

14. The system of claim 11, wherein the instructions which when executed by the processor are further operable to:
determine a source associated with the corresponding demographic field;
determine a quality score assigned to the source; and
determine the quality score for the corresponding demographic field as the quality score assigned to the source associated with the corresponding demographic field.

15. The system of claim 11, wherein the instructions which when executed by the processor are further operable to provide feedback to a plurality of record sources based on the determined reliability score.

16. A non-transitory computer readable storage including computer readable instructions, which when executed, operate to:
receive a request for a most reliable demographic fields data for a selected demographic field;
receive a plurality of records, each of the plurality of records comprising at least one demographic field;
identify a corresponding demographic field from the at least one demographic field corresponding to the selected demographic field for each of the plurality of records;
determine a reliability score for the corresponding demographic field that includes:
a determination of a frequency score associated with the corresponding demographic field,
a determination of an aging score based on a half-life of the selected demographic field and an age of a corresponding record, wherein the half-life of the selected demographic field is determined according to a half-life index, and
a determination of a quality score associated with the corresponding demographic field;
aggregate, the frequency score, the aging score, and the quality score to determine the reliability score for the corresponding demographic field; and determine the corresponding demographic field with a highest reliability score as the most reliable demographic fields data.

17. The non-transitory computer readable storage of claim 16, further including computer readable instructions, which when executed, operate to:
   determine a stored record associated with the entity;
   determine the corresponding demographic fields data in the stored record;
   compare the most reliable demographic fields data with corresponding demographic field data; and
   replace, when the most reliable demographic fields data does not match with the corresponding demographic field data, the corresponding demographic field data with the most reliable demographic fields data.

18. The non-transitory computer readable storage of claim 16, further including computer readable instructions, which when executed, operate to provide feedback to a plurality of record sources based on the determined reliability score.

19. The non-transitory computer readable storage of claim 16, further including computer readable instructions, which when executed, operate to:
   determine each instance of unique demographic fields data from the corresponding demographic field;
   determine an occurrence count for each unique demographic fields data from the plurality of records; and
   determine the frequency score based on the occurrence count and a total number of corresponding demographic fields.

20. The non-transitory computer readable storage of claim 16, further including computer readable instructions, which when executed, operate to:
   determine a source associated with the corresponding demographic field;
   determine a quality score assigned to the source; and
   determine the quality score for the corresponding demographic field as the quality score assigned to the source associated with the corresponding demographic field.

* * * * *